(12) United States Patent
Naftulin

(10) Patent No.: US 9,280,361 B2
(45) Date of Patent: Mar. 8, 2016

(54) METHODS AND SYSTEMS FOR A REAL TIME TRANSFORMATION OF DECLARATIVE MODEL AND LAYOUT INTO INTERACTIVE, DIGITAL, MULTI DEVICE FORMS

(75) Inventor: Stas Naftulin, Tel-Aviv (IL)

(73) Assignee: PNMSoft Ltd., Natania (IL)

( * ) Notice: Subject to any disclaimer, the term of this patent is extended or adjusted under 35 U.S.C. 154(b) by 738 days.

(21) Appl. No.: 13/531,684

(22) Filed: Jun. 25, 2012

(65) Prior Publication Data

US 2013/0346845 A1    Dec. 26, 2013

(51) Int. Cl.
*G06F 9/44*    (2006.01)

(52) U.S. Cl.
CPC ............. *G06F 9/4443* (2013.01); *G06F 8/38* (2013.01)

(58) Field of Classification Search
USPC .................................................. 715/221, 222
See application file for complete search history.

(56) References Cited

U.S. PATENT DOCUMENTS

| | | | |
|---|---|---|---|
| 5,619,708 A * | 4/1997 | Ho ............................... | 715/224 |
| 6,289,382 B1 * | 9/2001 | Bowman-Amuah ........... | 709/226 |
| 6,721,747 B2 * | 4/2004 | Lipkin .......................... | 709/209 |
| 7,010,580 B1 * | 3/2006 | Fu et al. ........................ | 709/217 |
| 7,523,444 B2 * | 4/2009 | Quinn et al. .................. | 717/120 |
| 2002/0085020 A1 * | 7/2002 | Carroll, Jr. .................... | 345/700 |
| 2002/0133516 A1 * | 9/2002 | Davis .................... G06F 17/243 715/205 |  |
| 2002/0143941 A1 * | 10/2002 | Rich et al. ..................... | 709/225 |
| 2003/0226109 A1 * | 12/2003 | Adamson et al. ............. | 715/513 |
| 2005/0138634 A1 * | 6/2005 | Luty et al. ..................... | 719/315 |
| 2006/0004725 A1 * | 1/2006 | Abraido-Fandino ............. | 707/3 |
| 2009/0077175 A1 * | 3/2009 | DeAnna et al. ............... | 709/203 |
| 2011/0004628 A1 * | 1/2011 | Armstrong et al. ........... | 707/778 |
| 2012/0260154 A1 * | 10/2012 | Delancy, Jr. .......... G06F 17/243 715/221 |  |

OTHER PUBLICATIONS

"Compile;" Microsoft Computer Dictionary; May 1, 2002; Fifth Edition; p. 144.*
"Binding a Control to a Data Source;" Visual Basic Concepts; May 17, 2011; msdn.microsoft.com; pp. 1-4.*

* cited by examiner

*Primary Examiner* — Andrew Dyer

(57) ABSTRACT

Methods and system of creating a multi device interactive form. At design time a declarative data model having a plurality of queries each said query having a data source definition and plurality of fields and plurality of data entry view for a runtime data model of said declarative data model are defined and associated. At runtime the runtime data model is generated using reflection classes and annotation attributes the data entry view is presented as an interactive form having UI controls to a user.

22 Claims, 11 Drawing Sheets

Customers

| | Name | Type | |
|---|---|---|---|
| Select | fldId | Int32 | |
| Select | FldIWfId | Int32 | |
| Select | fldIActId | Int32 | |
| Select | fldAIId | Int32 | |
| Select | CustomerName | Int32 | Delete |
| Select | CustomerCredit | Int32 | Delete |
| Select | UpdatedDate | DateTime | Delete |

Add New Field

Properties
Misc

| DataSourceExpression | |
|---|---|
| DataSourceName | UpdatedDate |
| DataSourceType | |
| DefaultValue | |
| DisplayName | UpdatedDate |
| IsComputed | ☐ |
| IsGenerated | ☐ |
| IsPrimaryKey | ☐ |
| IsSystem | ☐ |
| MaxLength | 0 |
| Nullable | √ |
| SyncMode | Default |

Switch to Basic Mode

| Back | | Finish | | Cancel |

FIG. 3A

Stored Procedures

| USPEXAMPLE |
| USPExampleWithTotal |

Parameters of the Stored Procedure 'USPExampleWithTotal'

| Name | Type | Size | Mask | Value |
|---|---|---|---|---|
| @active | Boolean | 0 | In ▶ | true |
| @searchvalue | String | 255 | Filter ▶ | ... |
| @fieldvalue | String | 255 | In ▶ | ... |
| @pagesize | Int32 | 0 | PageSize ▶ | ... |
| @pageindex | Int32 | 0 | PageIndex ▶ | ... |
| @totalrowscount | Int32 | 0 | TotalItemCount ▶ | ... |

Name | USPExampleWithTotal |

Next | Cancel

FIG. 3D

Internal Data Source

[Show Fields]

Method Return Value Fields

Existing fields of your selected method
IsSyndicationReader
JavaAppletsSupported
JavaScriptSupported
MajorVersion
MESSAGE
MinorVersion
MinorVersionLetter
MouseOver
MSN
NETCLR
NetscapeGold
OSInformation
Platform
PNGSupported
SSLActive
SSLCipherSuite
SSLSupported
TableBackgroundColor
TableBackgroundImage
Tables
UserAgent
UserLanguage
VBScriptSupported
Type an Expression

\>\>

...  \>\>

Service Projection
The fields of your query

| Name | Projection Field | | |
|---|---|---|---|
| AOLVersion | AOLVersion | ... | Delete |
| BackgroundSounds | BackgroundSounds | ... | Delete |
| Crawler | Crawler | ... | Delete |
| IsSyndicationReader | IsSyndicationReader | ... | Delete |

[Back] [Finish] [Cancel]

FIG. 3E

| DefaultMobileView ▼ | Delete | | New | | | Properties View | |
|---|---|---|---|---|---|---|---|
| | | | | | | (Name) Alias | DefaultMobileView |
| | | Charge Approval | | | | Id | 96827f85-6ba1-4eb3-bc0c-Ae3550e012d0 |
| | | Request Details | | | | IsActive | √ |
| ToolBox | | | | | | | |
| ▼ Layout | | Customer [Customer] | | | | | |
|   One-Column Table | | Request [Request] | | | | | |
|   Two-Column Table | | Details [Details] | | | | | |
|   Three-Column Table | | Charge $[Charge] | | | | | |
|   Panel | | | | | | | |
| ▼ Editors | | Approval | | | | | |
|   Label | | | | | | | |
|   TextBox | | Approved ☐ | | | | | |
|   Button | | Comments | | | | | |
|   DropDownList | | | | | | | |
|   ListBox | | | | | | | |
|   CheckBox | | | | | | | |
|   CheckBoxList | | | | | | | |
|   RadioButton | | | Submit | | | | |
|   RadioButtonList | | | | | | | |
|   HiddenField | | | | | | | |
|   FormLoader | | | | | | | |
| ▼ Data | | | | | | | |
|   FormView | | | | | | | |
|   GridView | | | | | | | |
|   EntityDataSource | | | | | | | |
| ▼ Standard | | | | | | | |
|   Label | | Design | Split | | Source | | |
|   TextBox | | | | | | | |
| Tool box    Data Sources | | | | | | | |

FIG. 4

METHODS AND SYSTEMS FOR A REAL TIME TRANSFORMATION OF DECLARATIVE MODEL AND LAYOUT INTO INTERACTIVE, DIGITAL, MULTI DEVICE FORMS

BACKGROUND

The present invention, in some embodiments thereof, relates to form generaion and, more specifically, but not exclusively, to a methods and systems of interactive form generation.

Data-entry platforms and interactive user interfaces are well known in the art. In many applications, data-entry platforms are used in conjunction with interactive user interfaces to capture data from a user. A data-entry form is displayed on an interactive user interface such that a user can enter data into the data-entry form. For example, the use of databases and spreadsheets is known in the art for capturing data from a user through a data-entry form displayed on an interactive user interface. It is also known in the art to supply a data-entry form that has a plurality of data-entry opportunities.

Developing an interactive form consists both in defining the structure to be used by the back-end for storing and retrieving data (that is, the complement of tables which store data, and the relational links between these tables), and in building a front-end program, known as a view, via which end-users can manipulate this data. These back end and front end components have to be closely synchronized and reflect similar structures and take into account bandwidth, performance, scalability, agility, security and/or other factors.

SUMMARY

According to some embodiments of the present invention there is provided, a method of creating an interactive form. The method comprises at design time: defining a declarative data model having a plurality of queries each the query having a data source a plurality of fields, defining a data entry view for a runtime data model of the declarative data model, the data entry view having a plurality of data entry view data sources and a plurality of user interface (UI) controls, and associating between each one of the plurality of UI controls and a field of the plurality of fields of the plurality of queries. At runtime: generating the runtime data model using a plurality of reflection classes annotated with attributes, automatically creating a plurality of adapters according to the data entry view, the plurality of adapters being used to assign the query data from the plurality of data entry view data sources into the plurality of UI controls, presenting the data entry view as an interactive multi device form having the plurality of UI controls, and using the runtime data model for loading query data into the plurality of data entry view data sources using data context object that is created from the runtime model;

Optionally, the defining a data entry view comprises associating between the plurality of data entry view data sources and the plurality of queries and between the plurality of data entry view data sources and a plurality of data bound controls which includes the plurality of user interface (UI) controls.

Optionally, the declarative data model and the data entry view are defined by separate wizards who are presented to a user.

More optionally, the declarative data model is used for creating a plurality of runtime models; each the runtime model is associated with a different of a plurality of different data entry views.

Optionally, the generating is performed without compilation.

Optionally, the generating comprises creating an in-memory object representing the runtime data model.

More optionally, the method further comprises adjusting the runtime data model in the in-memory object by editing the declarative data model and without creating a new in-memory object.

More optionally, the method further comprises adjusting at least one of the plurality of data entry view data sources and the plurality of user interface (UI) controls without creating a new in-memory object.

Optionally, the method further comprises using control extenders to create automatically the plurality of adapters.

Optionally, the generating comprises: generating a builder object, and inputting an XML schema into a container generated by the builder object according to the declarative data model.

Optionally, the inputting is performed using sub builder objects.

Optionally, the queries are represented in the runtime data model by at least one reflected properties or methods generated according to the reflection classes.

Optionally, each the field having a plurality of properties which are represented in the runtime data model by at least one reflected property.

More optionally, the method further comprises using the runtime data model to retrieve query data from the query data sources into the reflected type instance that is generated from the data context.

According to some embodiments of the present invention there is provided, a system of creating an interactive form. The system comprises a design module for allowing a user, at design time, to define a declarative data model having a plurality of queries each the query having a plurality of fields and defining a data entry view for a runtime data model of the declarative data model by associating between a plurality of data entry view data sources and the plurality of queries and between the plurality of data entry view data sources and a plurality of data bound controls each having a plurality of user interface (UI) controls, an association module which uses a plurality of extenders to associate between each one of the plurality of UI controls and a field of the plurality of fields of the plurality of queries, and a runtime module which, at runtime, generates the runtime data model using a plurality of reflection classes and automatically creates a plurality of adapters according to the data entry view. The runtime data model is set to load query data into the plurality of data entry view data sources and assigns the query data into the plurality of UI controls using the plurality of adapters. The data entry view is presented as an interactive form having the plurality of UI controls.

Optionally, the system further comprises an interface which allows the user to define the declarative data model and the data entry view via a remote terminal.

According to some embodiments of the present invention there is provided, a method of creating an interactive form. The method comprises allowing a user to define, at design time, a declarative data model having a plurality of queries and a data entry view for a runtime data model of the declarative data model, each the query having a plurality of fields and the data entry view having a plurality of data entry view data sources and a plurality of user interface (UI) controls which are associated with UI control extender which is associated with the plurality of fields of the plurality of queries, generating the runtime data model at runtime and without compilation, and using the runtime data model for loading query data into the plurality of data entry view data sources.

Optionally, the method further comprises automatically assigning the query data from the plurality of data entry view data sources into the plurality of UI controls and presenting the data entry view as an interactive form having the plurality of UI controls.

Optionally, the generating is performed using a plurality of reflection classes and properties annotated with attributes.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3A is a screenshot of an exemplary GUI facilitating a user to provide query entity (result structure), according to some embodiments of the present invention;

FIGS. 3C-3E are screenshots of exemplary GUIs facilitating the user to define data model query or to select consumable service type using a database procedure and executable service as the data source, according to some embodiments of the present invention;

FIG. 4 is a screenshot of an exemplary GUI facilitating the user to define a view, according to some embodiments of the present invention;

DETAILED DESCRIPTION

Figure 1:
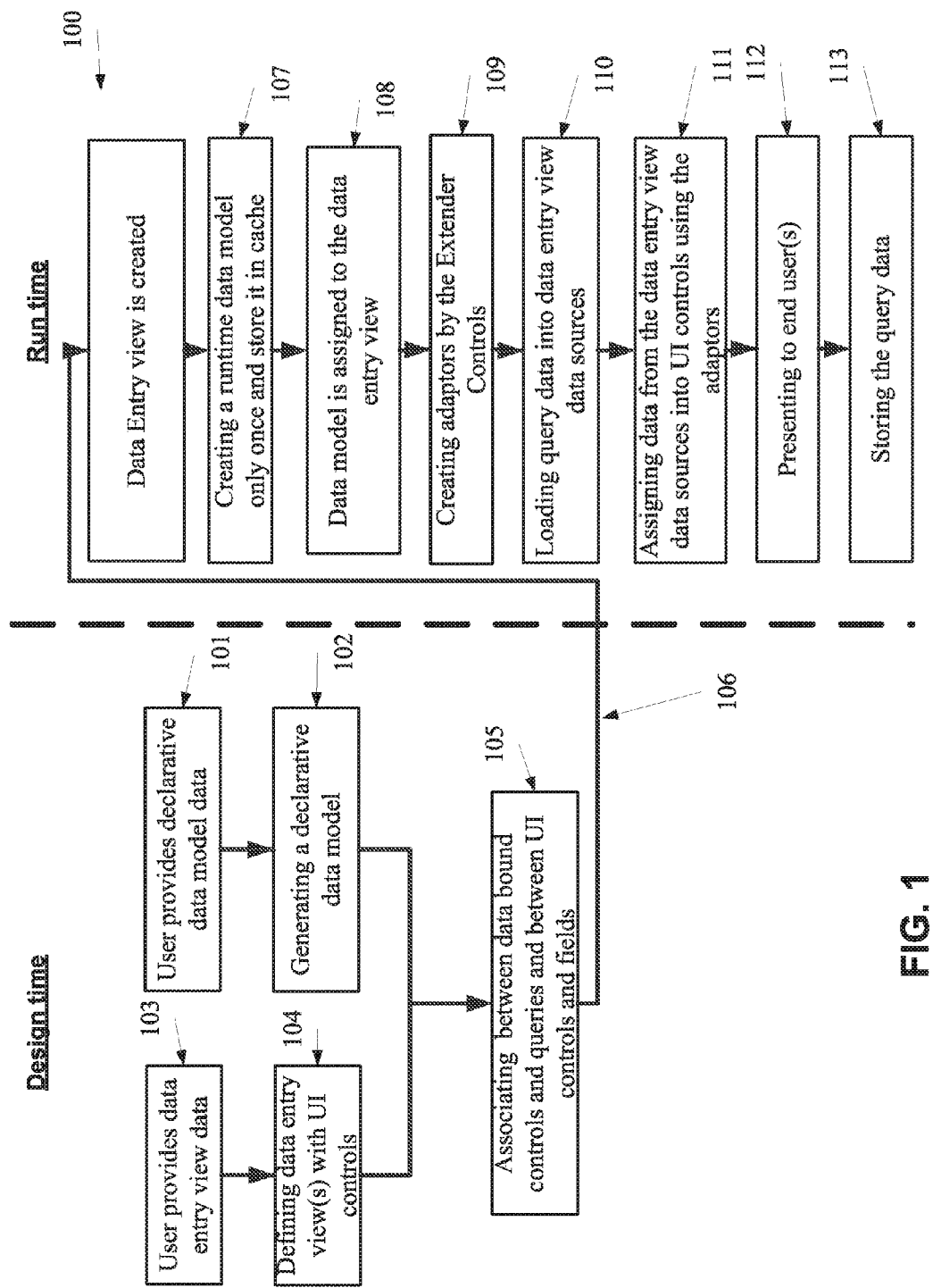
FIG. 1 is a flowchart of a method of allowing a form designing user to create an interactive form, optionally multi device, having a run time data model without compiling a declarative data model that is created in a design time, according to some embodiments of the present invention.

The present invention, in some embodiments thereof, relates to form generation and, more specifically, but not exclusively, to a methods and systems of interactive form generation.

According to some embodiments of the present invention, there are provided methods and systems which allow a user to define a declarative data model and a suitable data entry view at design time and generated at runtime, and optionally without compilation, a runtime data model. It should be noted that the data model is not limited to contain only database elements such as tables and/or stored procedures and may contain any consumable source that returns structured data, such as a web service, a windows communication foundation (WCF) service and/or the like.

Optionally, the user defines a plurality of different data entry views for the same declarative data model. In such a manner, the systems and methods may be used to create data entry views which are suitable for various computing platforms, such as handheld mobile devices, tablets, and laptops/desktops and/or for different operating systems.

The methods and systems allow a user to use a remote terminal, optionally executing a browser based application, for creating data entry forms using a central service. As no compilation is required in runtime, a high level of service may be assured at all times and enabling agility and maximum flexibility implementing changes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident, software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C#, C++or the like and conventional procedural programming languages, such as the "C" programming language or similar programming languages. The program code may execute entirely on the user's device (computer, hand-held mobile etc), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or mobile network, or the connection may be made to an external device (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
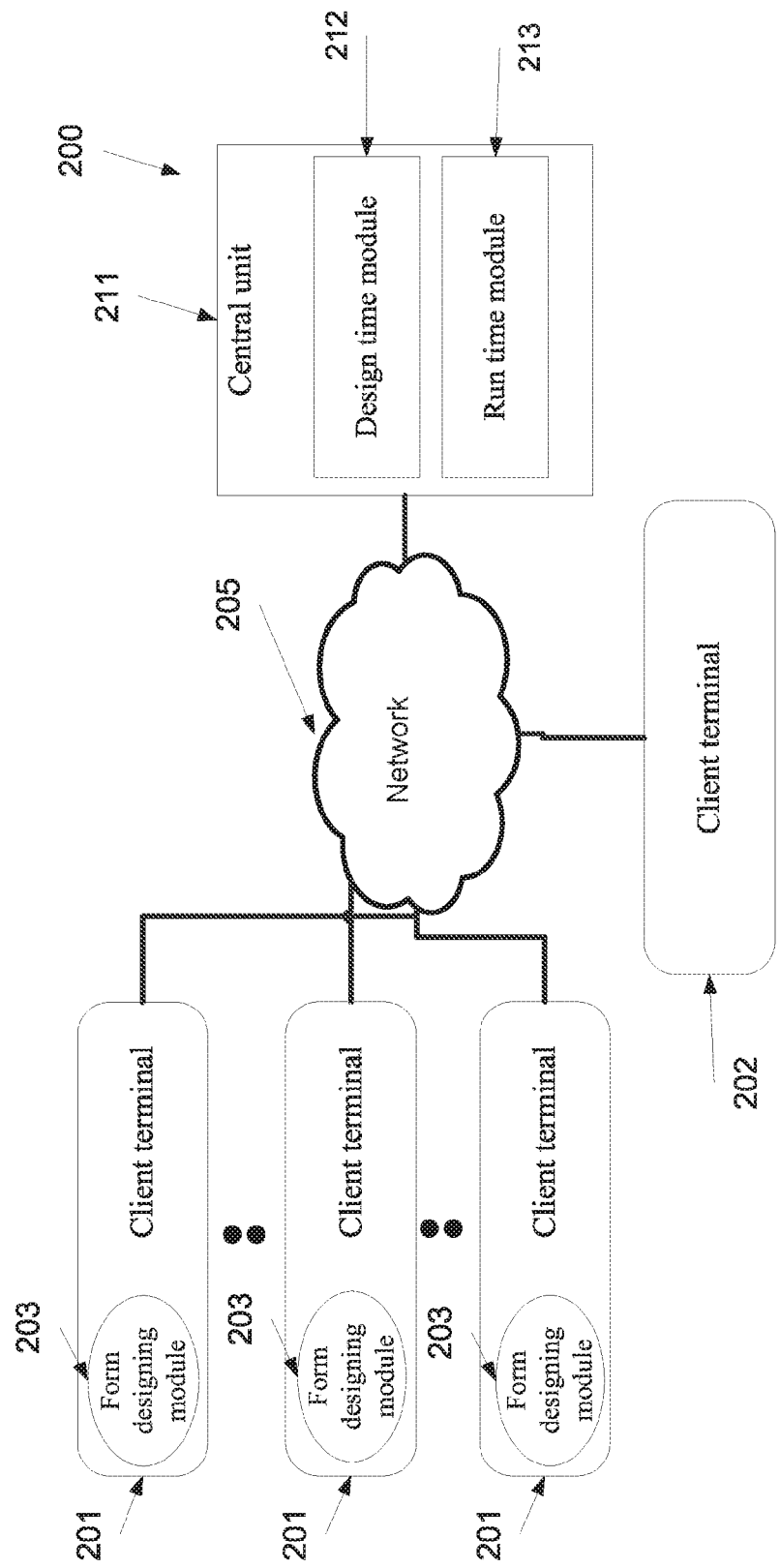
FIG. 2 is a schematic illustration of a system having a central unit that allows a plurality of client terminals to create interactive forms, for example as depicted in FIG. 1, according to some embodiments of the present invention.

Reference is now made to FIG. 1, which is a flowchart 100 of a method of allowing a form designing user to create an interactive form having a run time data model without compiling a declarative data model that is created in a design time, according to some embodiments of the present invention. Reference is also made to FIG. 2, which is a schematic illustration of a system 200 having a central unit 211 that allows a plurality of client terminals 201, such as laptops, desktops, tablets, and/or Smartphones to create interactive forms, for example as depicted in FIG. 1, according to some embodiments of the present invention. The created interactive forms are optionally accessed by end users who interact with the interactive forms from their own client terminals, for example 202. The interactive forms are optionally provided via a network 205.

Optionally, in order to allow form designing users to communicate with a design module 212 of the central unit 211 at design time, a form designing module is loaded to a client terminal, for example as a webpage in a browser. The form designing module 203 displays one or more graphical user interfaces (GUIs) for facilitating the form designing user to input data, for example as described below.

At design time, a form designing user defines, optionally using the form designing module 203, a declarative data model of an interactive form and a data entry view for the interactive form, optionally in separate procedures. The method 100 and the system 200 optionally allow the form designing user to associate the declarative data model with a number of different data entry views, for example data entry views which are adapted for different operating systems (OS)s and/or data entry views which are adapted for different platforms, for example Smartphones, laptops and desktops, and/or tablets. As the declarative data model is not compiled in runtime and it may be re-used from an in-memory object, interactive forms may be generated on the fly with low computational complexity requirements. This allows providing the users of the plurality of client terminals 201 with an interactive form generation service, such as software as a service (SaaS) that is executed on the central unit 201 of the system 200 (e.g. one or more network servers). In these embodiments, the form designing module 203, such as a slim developer platform, for example a graphical user interface (GUI) hosted by a browser running on a remote client terminal, receives declarative data model and/or instructions for creating the declarative data model from the form designing user and forwards the received data to the central unit 211 which computes a respective run time data model without compilation and connects the run time data model to a data entry view selected and/or set by the form designing user 202.

At design time, as shown at 101, user provides data inputs for the declarative data model, such as entities, which are query result structures, for example columns of a table, queries, for example table queries, web service queries, dynamic link library (DLL) service queries, windows communication foundation (WCF) service queries. Queries for a table, a service, a database code (such as stored procedure) and/or a data source may be defined. Each query has data source and entity (result structure). User may provide data inputs for the declarative data model, such as query data sources. A query data source indicates where to take data from. For example, data source employeesTable takes data from a database table called ViewActiveEmployees.

Figure 3B:
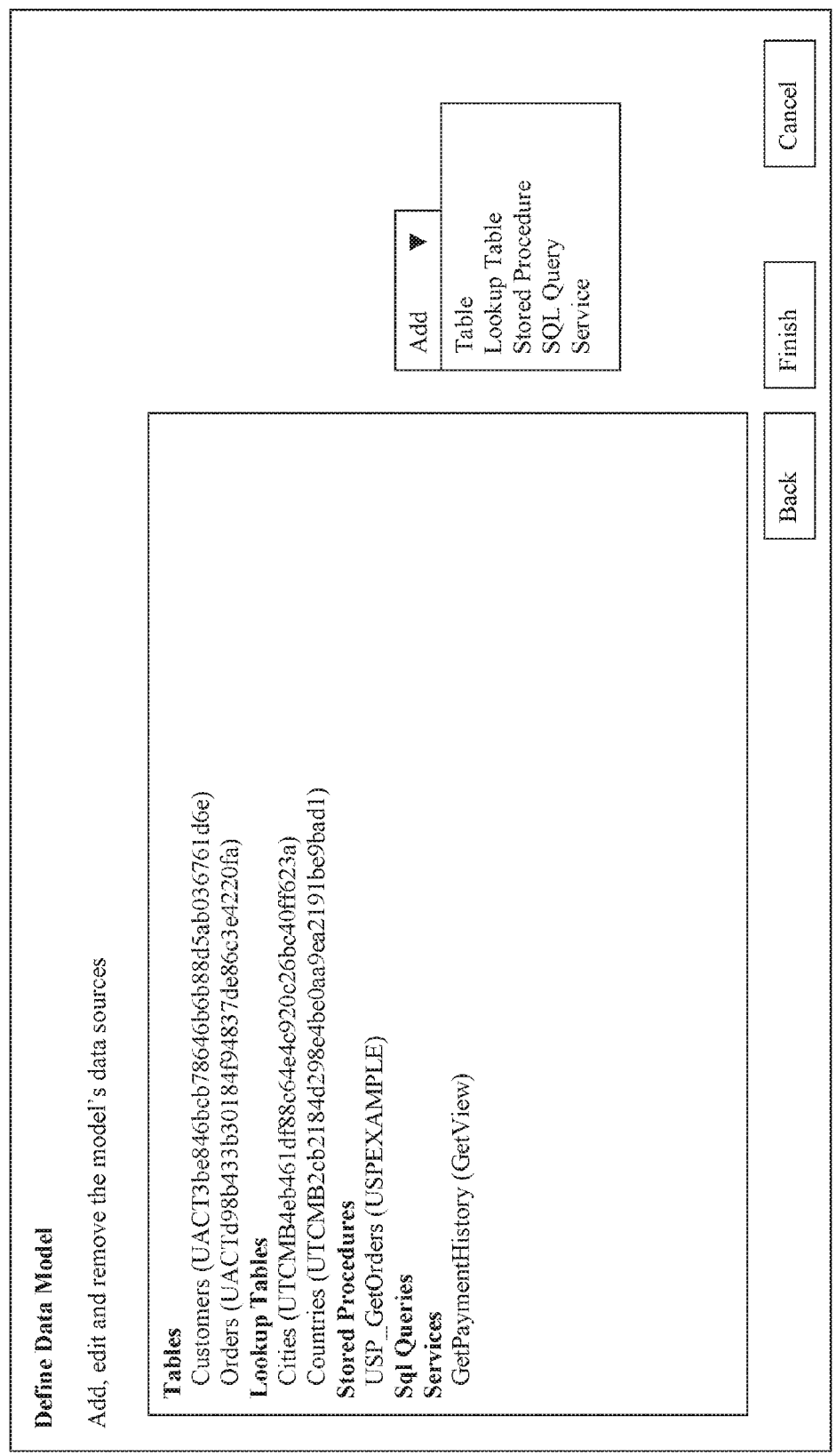
FIG. 3B is a screenshot of an exemplary GUI facilitating the user to provide query data source which are associated with the queries, according to some embodiments of the present invention.

For example, FIG. 3A is a screenshot of an exemplary GUI facilitating the user to provide query entity (result structure) (i.e. fields) and FIG. 3B is a screenshot of an exemplary GUI facilitating the user to provide query data source which are associated with the queries, according to some embodiments of the present invention.

Figure 3C:
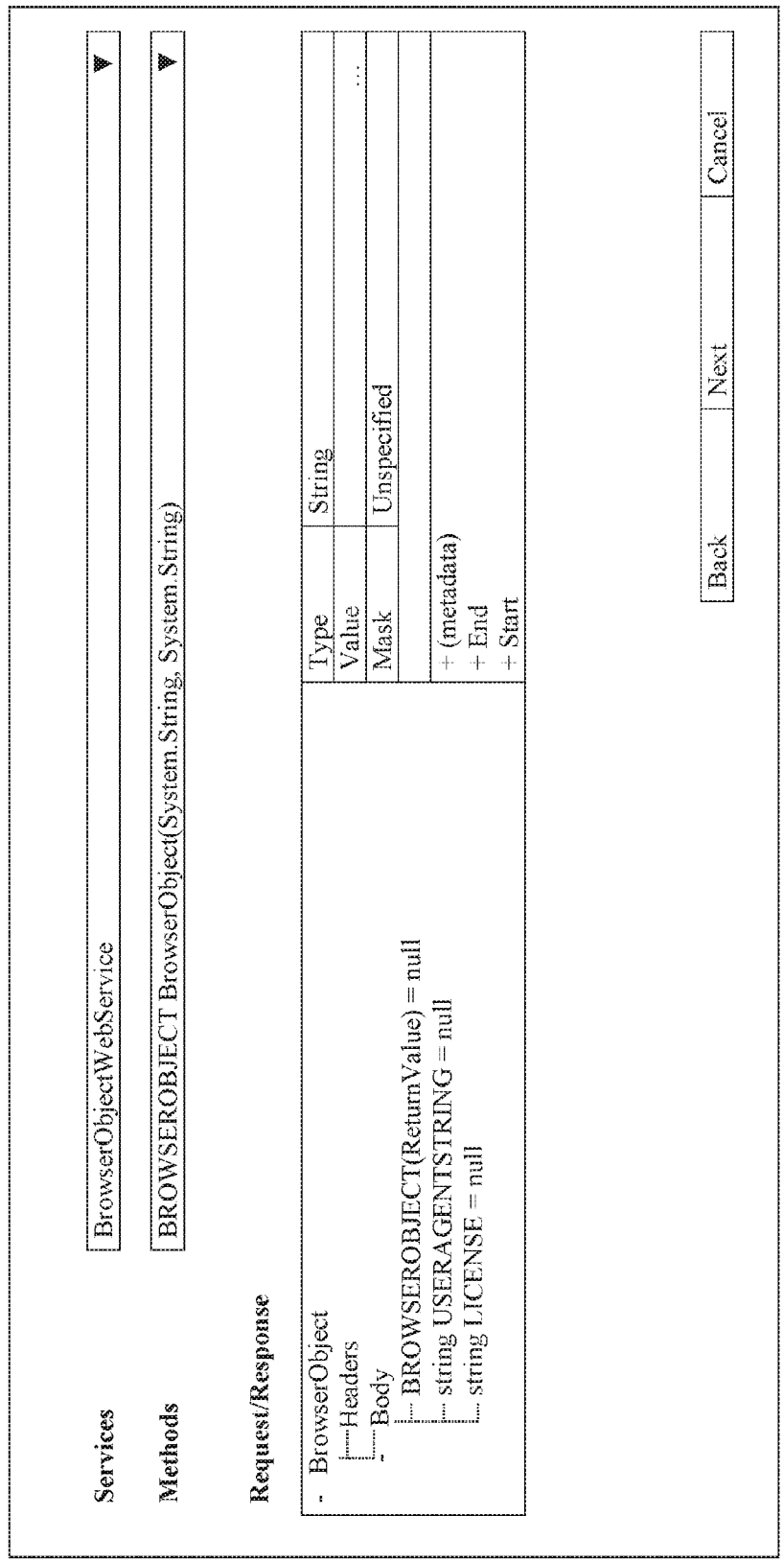

Based on the user inputs, as shown at 102, the declarative data model having the inputted queries is defined. Each query has a data source definition such as web service, table and/or the like and an entity definition with one or more fields, for example string field, such as customer name, customer address, integer field, such as customer credit limit, attachment field, such as customer contract, uniform resource locator (URL) field and/or the like. Optionally, different queries are defined using different wizards. For example, as depicted in FIGS. 3C and 3D for defining a stored procedure query the user selects the stored procedure name, maps the relevant parameter for execution, and defines which fields from the result structure are included in the query. In another example, as shown at FIGS. 3C and 3E, a user selects the consumable service type, such as a web service, a WCF Service, and a compiled assembly), provides details about the service and the method, maps values to the method parameters\objects, and selects which field from the result structure are used in the query.

Optionally, each field has one or more properties, for example ISPRIMARYKEY, ISNULLABLE, ISUPDATE-ABLE and/or the like. The user inputs, which are optionally sent to the central unit 211, may be marked up as an extensible markup language (XML) schema, such as a declarative XML model. The data model may define inheritance relationship, for example adding a reference to another query in the data model and/or another query in another data model.

Furthermore, also at the design time, as shown at 103, user provides inputs and/or selections indicative of one or more data entry view(s). For example, selected and/or created by the form designing user. For example, FIG. 4 is a screenshot of an exemplary GUI facilitating the user to define a data entry view, according to some embodiments of the present invention.

Based on the user inputs, as shown at 104, the data entry view is created. The data entry view is created by associating between a plurality of data entry view data source controls and the plurality of queries defined in the declarative data model and (105) associating between data bound controls (e.g. a grid structure and/or a form structure) and data entry view data source controls. Each data bound control is having one or more UI controls (e.g. a dialog box, a combo box, a list, a text field, and/or the like) associated with plurality of fields from the query entity (result structure).

The data entry view is associated with the declarative data model so that a data entry view data source has a query defined. Each data source control has all the details for the query execution.

As shown at 105, each data bound control is associated with a model query using an extender control that is persisted with the view mark-up, each one of the UI controls is associated with a different field of the query entity defined in the data model by using an UI control extender control. For example, each UI control is tied and/or bound to a field (i.e. a column in a row of a table)

As shown at 106, reference is now made to runtime actions.

Figure 5:
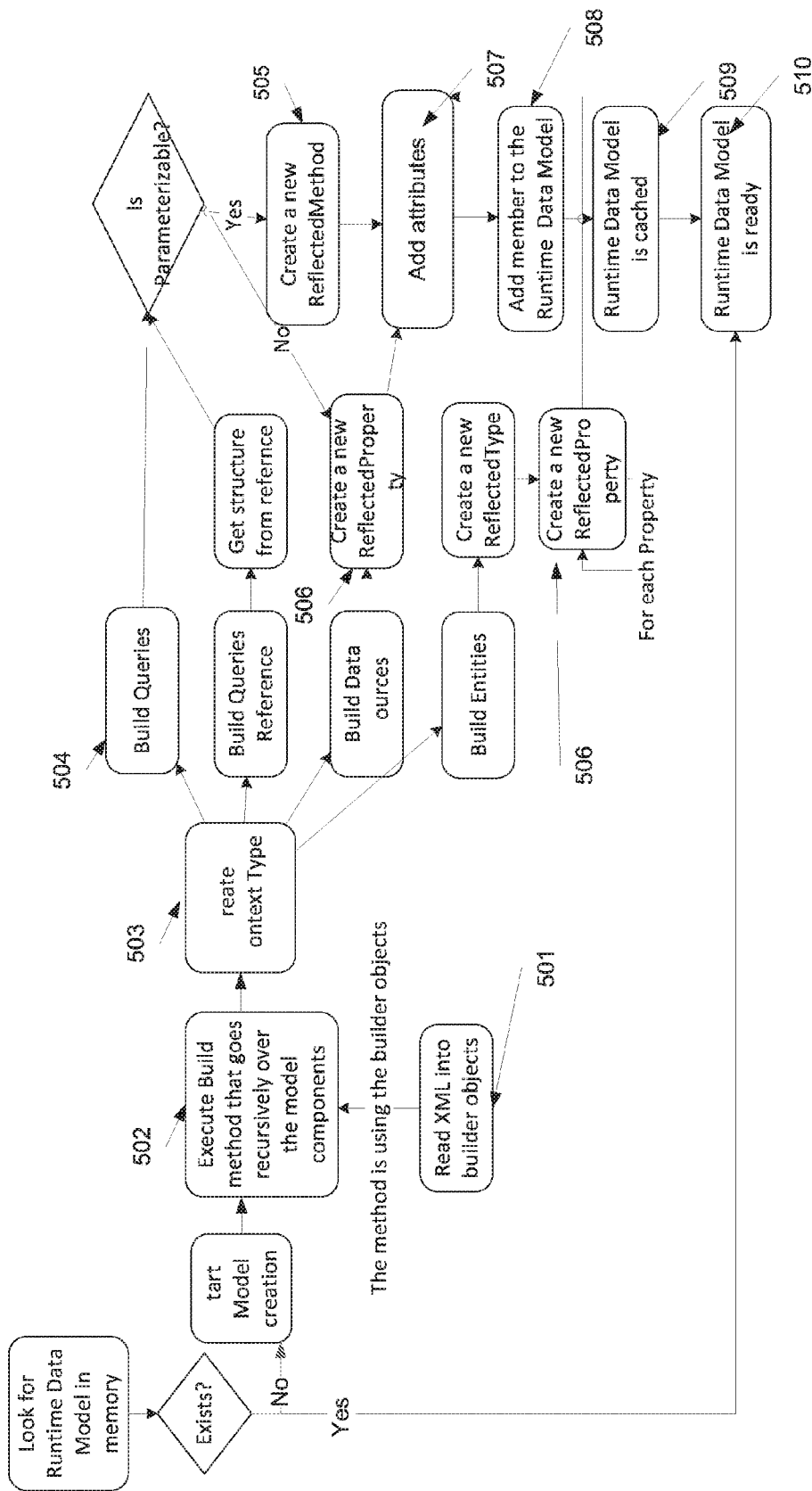
FIG. 5 is a flowchart of a process of creating a runtime data model, according to some embodiments of the present invention.

As shown at 107, a runtime data model of the declarative data model is generated using a plurality of reflection classes decorated with attributes. It is stored in memory for re-use later. For example, a reference is now made to FIG. 5 that is a flowchart of a process of creating a runtime data model, according to some embodiments of the present invention.

As shown at 108 Data model is assigned to the data entry view, so that the data entry view is aware of its data model As shown at 109, one or more high level adapters are automatically created by the data bound control extender in runtime according to the data entry view(s) the user created during the design time. As shown in 110 the data is loaded by the data context object that is created by the data manager control into the data entry view data sources. As shown at 111, Each UI control adapter assign data to a certain UI control and extracts data from a certain UI control. The assigned data is mapped to relevant properties, for example a text box presents values in a property text and in another example combo box values are taken from the value and\or text properties.

As shown at 501, a data model builder object is created from an XML schema provided according to user inputs. The builder object is created from the XML schema that is read into it. The builder object is an intermediate state before creating a runtime data model. The builder object is opened for read and write. Optionally, the builder object is set to create an argument representing a container having the entities, the queries and the query data sources defined at the declarative data model. Each query provided by the user may be defined as a record of a container that comprises the following parameters: a query name, Reference to the entity type (result structure), Reference to the data source. User defined entities, entities are added to a container and members are added to an entity. Properties and associations may be defined as many times as required for passing relevant parameters to the builder object. Query data sources may be defined as records and/or references in the container.

With regard to data entry view, the runtime model is generated by building the context type object is optionally created by reclusively generating objects for all elements in the builder, as shown at 503. Queries in the declarative data model are represented in the runtime data model by a new reflected property (i.e. a reflection object). Optionally, queries with parameters are represented as a reflected method having one or more parameters represented as one or more reflected parameter. Optionally Reference Query is loading the query structure from an external source. Optionally, as shown at 506, entities in the runtime data model are represented by new reflected type. Optionally, data sources in the runtime data model are represented by new reflected properties.

As shown at 507, attributes with the model metadata are added to each new reflected object, for example to each one of the object members, object properties, and/or object type. For example the value of IsPrimaryKey and IsIdentity are member of an attribute and may be binary (i.e. true or false). Attribute member may be textual, for example CommandText=SPGetCreditScore or DBtype=NVARCHAR(max).

These objects are then added to the context type objects (runtime data model) as shown in 508.

As shown in 509 the runtime model is cached in the application memory, it is now ready to use in the next request for this model.

As shown at 110, after the runtime data model is generated, the runtime data model is used to allow data context object to retrieve query data from the query data sources into the data entry view data sources and optionally to store this data, for example as described below.

As shown at 109, one or more high level adapters are automatically created in runtime according to the data entry view(s) the user created during the design time. As shown at 110, each high level adapter connects between a data entry view data source and a Data bound control. Each UI control adapter assign data to a certain UI control and extracts data from a certain UI control, for example a text box presents values in a property text and in another example combo box values are taken from the value and\or text properties.

Figure 6:
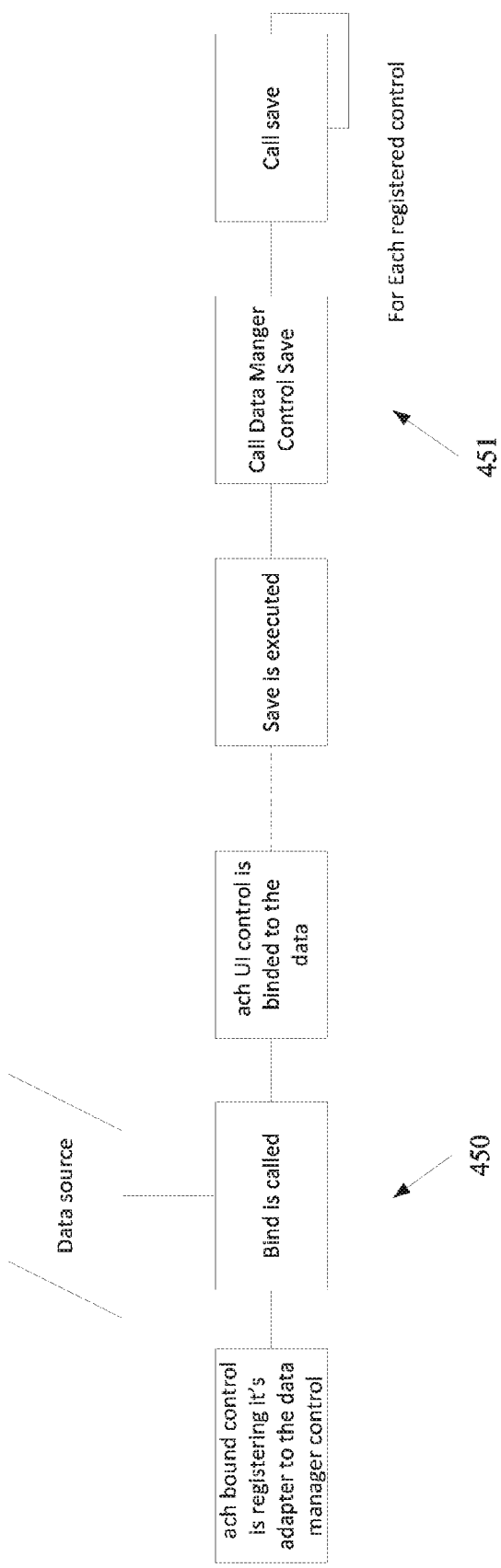
FIG. 6 is a diagram a runtime process, according to some embodiments of the present invention.
Figure 7:
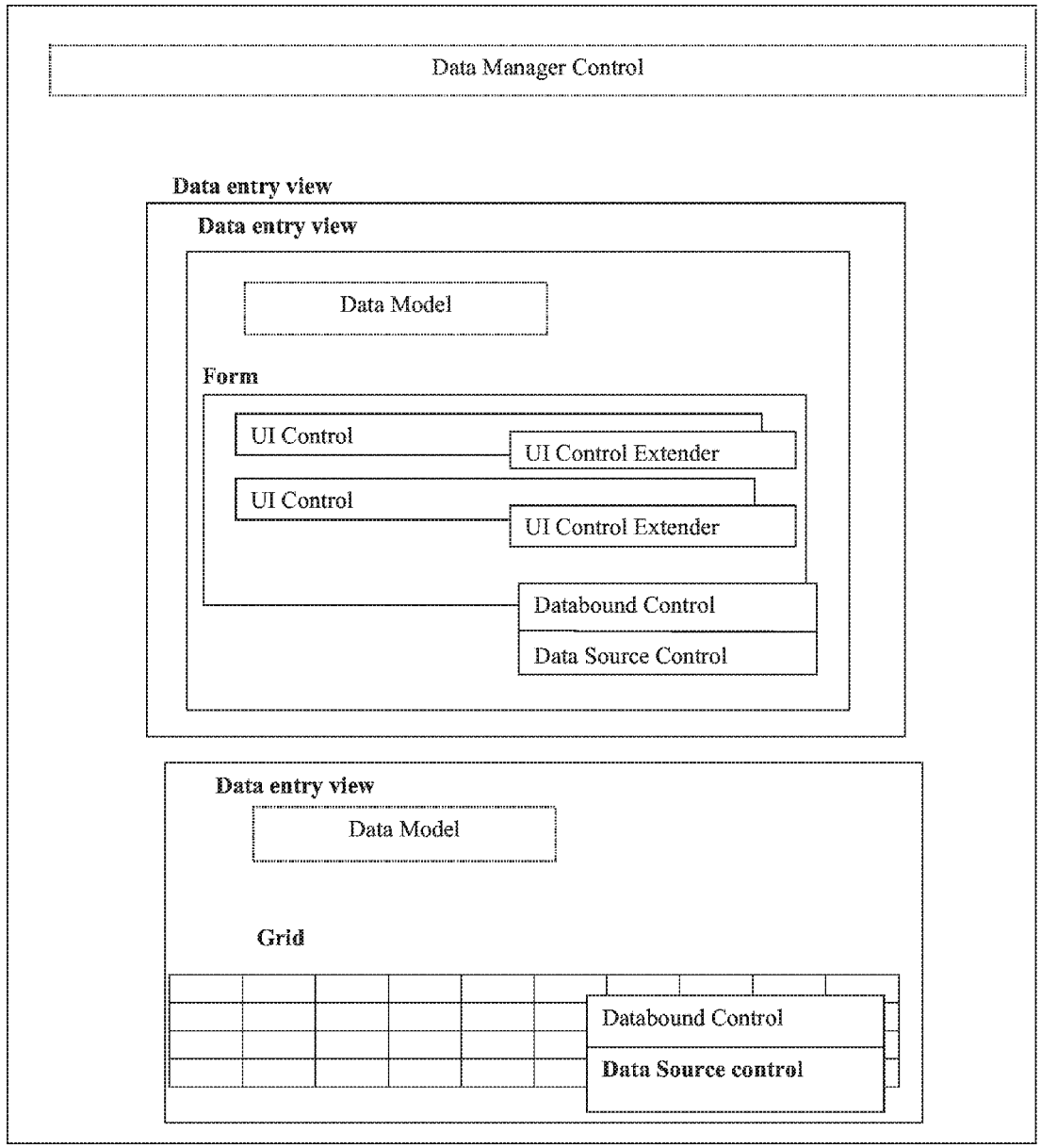
FIG. 7 is a schematic illustration of a declarative entry view controls hierarchy, according to some embodiments of the present invention.

Reference is now made to FIG. 6, which is a diagram a runtime process, according to some embodiments of the present invention. The left side 450 of the flowchart indicates that when the form is loaded in runtime, the Data bound control Extender(s) register their adapter(s) to a data manager control that represents a shared execution environment for a set of data contexts. Its responsibility is to create data context per data model, provide cross data context functionality, for example, entity property default value calculation FIG. 7, is a schematic illustration of a data entry view which includes data manager control. An adapter object is created for each data bound control. Optionally, an adapter object is created for each UI control. Optionally each data entry view can include sub-data entry view.

Now, as shown at 112 of FIG. 1, an interactive form having the plurality of UI controls is presented by plural devices to user(s). The presentation allows user(s) to interact with the plurality of UI controls, for example typing data, selecting records from a list, uploading files, capturing images and/or the like.

Optionally, as shown at 113, and exemplified in the right side 451 of FIG. 6, input data is stored in the fields of the object of entity type according to the association defined between each one of the UI controls and the different fields of queries at the design time. For example, a save button is added to the form and/or to the page in which the form is presented. When a save button is clicked, the data manager control is requested to store data added to and/or selected in the respective data entry view. The data manager control goes through all the Data bound controls Extenders which are part of the data entry view and sub view of the data entry view that requested saving. For each extender the data manger may execute an update method on the respective adapter that handles the update for the data bound control.

Optionally, in order to reduce computational complexity and improve performances, only changes are gathered and stored.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a network, a system, a server, and a module is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of creating an interactive form, comprising:
    at design time:
        defining a declarative data model having a plurality of queries according to user input data received from a designer platform hosted by a browser running a client terminal, each query of said plurality of queries has a data source and a plurality of fields;
        defining a plurality of data entry views for a runtime data model of said declarative data model, each said data entry view is defined for a different operating system or a different platform having a plurality of data entry view data sources and a plurality of user interface (UI) controls; and
        associating between each one of said plurality of UI controls and a field of said plurality of fields;
    at runtime:
        generating said runtime data model using a plurality of reflection classes annotated with attributes;
        automatically creating a plurality of adapters using data bound control extenders according to a selected data entry view from said plurality of data entry views, said plurality of adapters being used to assign said query data from said plurality of data entry view data sources into said plurality of UI controls;
        instructing a presentation of said selected data entry view as an interactive multi device form having said plurality of UI controls; and
    using said runtime data model for loading query data into said plurality of data entry view data sources using data context object that is created from the runtime model.

2. The method of claim 1, wherein said defining a data entry view comprises: associating between said plurality of data entry view data sources and said plurality of queries, and between said plurality of data entry view data sources and a plurality of data bound controls which includes said plurality of user interface (UI) controls.

3. The method of claim 1, wherein said declarative data model and said data entry view are defined by separate wizards which are presented to a user.

4. The method of claim 1, wherein said declarative data model is used for creating a plurality of runtime models;
    each said runtime model is associated with a different of a plurality of different data entry views.

5. The method of claim 1, wherein said generating is performed without compilation.

6. The method of claim 1, wherein said generating comprises creating an in-memory object representing said runtime data model.

7. The method of claim 6, further comprising adjusting said runtime data model in said in-memory object by editing said declarative data model and without creating a new in-memory object.

8. The method of claim 6, further comprising adjusting at least one of said plurality of data entry view data sources and said plurality of user interface (UI) controls without creating a new in-memory object.

9. The method of claim 1, wherein said generating comprises:
    generating a builder object,
    inputting an XML schema into a container generated by said builder object according to said declarative data model.

10. The method of claim 1, wherein said inputting is performed using a builder object.

11. The method of claim 1, wherein said queries are represented in said runtime data model by at least one reflected properties or methods, wherein the reflected properties or methods are generated according to said reflection classes.

12. The method of claim 1, wherein each said field having a plurality of properties which are represented in said runtime data model by at least one reflected property.

13. The method of claim 1, further comprising using said runtime data model to retrieve query data from said query data sources into said reflected type instance that is generated from the data context.

14. The method of claim 1, wherein said interactive multi device form includes different data entry views defined for the same declarative data model, each data entry view adapted for at least one of a different operating system and a different platform.

15. The method of claim 1, further comprising storing user input data received from said plurality of UI controls according to said association between each one of the said plurality of UI controls and said plurality of fields.

16. A non-transitory computer readable medium comprising computer executable instructions adapted to perform the method of claim 1.

17. A computer program product for creating an interactive form, comprising:
    a non-transitory computer readable storage medium;
    first program instructions to define a declarative data model having a plurality of queries according to user input data received from a designer platform hosted by a browser running a client terminal, each query of said plurality of queries has a plurality of fields and a plurality of data sources for a runtime data model of said declarative data model, to define a plurality of data entry views for said runtime data model of said declarative data model, each said data entry view is defined for a different operating system or a different platform having a plurality of data entry view data sources and a plurality of user interface (UI) controls, and associating between a plurality of data entry view data sources and said plurality of queries and between said plurality of data entry view data sources and a plurality of data bound controls each having a plurality of user interface (UI) controls;
    second program instructions to associate between each one of said plurality of UI controls and a field of said plurality of fields;
    third program instructions to generate said runtime data model using a plurality of reflection classes;
    fourth program instructions to use said runtime data model for loading query data into said plurality of data entry view data sources;

fifth program instructions to create automatically a plurality of adapters using data bound control extenders according to a selected data entry view from said plurality of data entry views, said plurality of adapters being used to assign said query data from said plurality of data entry view data sources into said plurality of UI controls; and sixth program instructions to present automatically said selected data entry view as an interactive form having said plurality of UI controls;

wherein said first, second, third, fourth, fifth and sixth program instructions are stored on said non-transitory computer readable storage medium.

18. A system of creating an interactive form, comprising:
a processor; and
a non-transitory computer readable medium comprising computer executable instructions executable by the processor, comprising:
instructions to allow a user, at design time, to define a declarative data model having a plurality of queries according to user input data received from a designer platform hosted by a browser running a client terminal, each query of said plurality of queries has a data source and a plurality of fields, and defining a plurality of data entry views for a runtime data model of said declarative data model, each said data entry view is defined for a different operating system or a different platform having a plurality of data entry view data sources and a plurality of user interface (UI) controls, and associating between a plurality of data entry view data sources and said plurality of queries and between said plurality of data entry view data sources and a plurality of data bound controls each having a plurality of user interface (UI) controls;
instructions to use a plurality of extenders to associate between each one of said plurality of UI controls and a field of said plurality of fields; and
instructions for execution at runtime, to generate said runtime data model using a plurality of reflection classes and automatically creates a plurality of adapters using data bound control extenders according to a selected data entry view from said plurality of data entry views;
wherein said runtime data model is set to load query data into said plurality of data entry view data sources and assigns said query data into said plurality of UI controls using said plurality of adapters, and
instructions to present said selected data entry view as an interactive form having said plurality of UI controls.

19. The system of claim 18, further comprising an interface which allows said user to define said declarative data model and said data entry view via a remote terminal.

20. A method of creating an interactive form, comprising:
allowing a user to define, at design time, a declarative data model having a plurality of queries according to user input data received from a designer platform hosted by a browser running a client terminal, and a plurality of data entry views for a runtime data model of said declarative data model, each said data entry view is defined for a different operating system or a different platform having a plurality of data entry view data sources and a plurality of user interface (UI) controls, each query of said plurality of queries has a plurality of fields and said data entry view having a plurality of data entry view data sources and a plurality of user interface (UI) controls which are associated with UI control extender which is associated with said plurality of fields;
generating said runtime data model at runtime and without compilation according to a selected data entry view from said plurality of data entry views;
using said runtime data model for loading query data into said plurality of data entry view data sources.

21. The method of claim 20, further comprising:
automatically assigning said query data from said plurality of data entry view data sources into said plurality of UI controls, and
presenting said data entry view as an interactive form having said plurality of UI controls.

22. The method of claim 20, wherein said generating is performed using a plurality of reflection classes and properties annotated with attributes.

* * * * *